(12) United States Patent
Nasu et al.

(10) Patent No.: US 11,073,213 B2
(45) Date of Patent: Jul. 27, 2021

(54) BUTTERFLY VALVE

(71) Applicant: ASAHI YUKIZAI CORPORATION, Nobeoka (JP)

(72) Inventors: Takashi Nasu, Nobeoka (JP); Shinobu Kamimura, Nobeoka (JP)

(73) Assignee: ASAHI YUKIZAI CORPORATION, Nobeoka (JP)

( * ) Notice: Subject to any disclaimer, the term of this patent is extended or adjusted under 35 U.S.C. 154(b) by 0 days.

(21) Appl. No.: 16/960,590

(22) PCT Filed: Jan. 8, 2019

(86) PCT No.: PCT/JP2019/000230
§ 371 (c)(1),
(2) Date: Jul. 8, 2020

(87) PCT Pub. No.: WO2019/139004
PCT Pub. Date: Jul. 18, 2019

(65) Prior Publication Data
US 2020/0393048 A1 Dec. 17, 2020

(30) Foreign Application Priority Data
Jan. 10, 2018 (JP) .............................. JP2018-001829

(51) Int. Cl.
*F16K 1/22* (2006.01)
(52) U.S. Cl.
CPC .............. *F16K 1/222* (2013.01); *F16K 1/221* (2013.01)
(58) Field of Classification Search
CPC .................................. F16K 1/22; F16K 1/222
(Continued)

(56) References Cited

U.S. PATENT DOCUMENTS 4,457,490 A * 7/1984 Scobie .................. F16K 1/2263
251/174
4,773,625 A * 9/1988 Calvin .................. F16K 1/2261
228/165

(Continued)

FOREIGN PATENT DOCUMENTS

EP 2816264 B1 * 3/2016 ......... F16K 27/0218
JP S51-43929 U 3/1976
(Continued)

OTHER PUBLICATIONS

Machine Translation EP 2816264.*
PCT/ISA/210, "International Search Report for International Application No. PCT/JP2019/000230," dated Mar. 26, 2019.

*Primary Examiner* — Kevin F Murphy
(74) *Attorney, Agent, or Firm* — Manabu Kanesaka

(57) ABSTRACT

An eccentric butterfly valve includes a valve body formed therein with an internal flow passage extending in a direction of the flow passage axis, a disk-shaped valve member disposed in the internal flow passage and supported by the valve body through valve stems to be rotatable about a rotation axis R, and an annular valve seat portion provided on an inner periphery of the internal flow passage, and the internal flow passage is opened and closed by rotating the valve stem to bring a sealing surface of an outer peripheral edge portion of the valve member into and out of contact with the valve seat portion. The valve member is further provided in one of the principal surfaces with a groove portion extending in a direction across the rotation axis R, and both side walls of the groove portion are formed as convex curved surfaces extending in a convex shape.

11 Claims, 9 Drawing Sheets

(58) Field of Classification Search
USPC .......................................................... 251/208
See application file for complete search history.

(56) References Cited

U.S. PATENT DOCUMENTS

| 9,057,445 B2 * | 6/2015 | Sisk .................. F16K 1/222 |
| 2009/0309056 A1 | 12/2009 | Tsai |
| 2017/0067562 A1 * | 3/2017 | Thiessen .............. F16K 1/222 |

FOREIGN PATENT DOCUMENTS

| JP | S62-131166 U | 8/1987 |
| JP | H07-113472 A | 5/1995 |
| JP | 2014-047858 A | 3/2014 |

* cited by examiner

BUTTERFLY VALVE

RELATED APPLICATIONS

The present application is National Phase of International Application No. PCT/JP2019/000230 filed Jan. 8, 2019, and claims priority from Japanese Application No. 2018-001829, filed Jan. 10, 2018, the disclosure of which is hereby incorporated by reference herein in its entirety.

TECHNICAL FIELD

The present invention relates to a butterfly valve, which is used for fluid transport piping lines in various industries, opening and closing a flow passage by rotating a valve member.

BACKGROUND ART

In various industries, such as a chemical factory, a semiconductor manufacturing field, a food field, and a biotechnology field, a butterfly valve is used for opening and closing or controlling a flow passage through which various kinds of fluid flow. In the butterfly valve, a disk-shaped valve member rotatably supported by a valve body with a valve stem is disposed in a tubular flow passage formed in the valve body. The valve stem is rotated by a handle or an actuator connected to the valve stem and an outer peripheral edge portion of the valve member is brought into and out of contact with an annular sheet member provided between the inner peripheral surface of the flow passage or the valve body and the outer peripheral edge portion of the valve member, thus opening and closing the flow passage.

The butterfly valve has a configuration as described above, and therefore, even when the valve is fully opened, the valve member is arranged at the center of the flow passage of the valve body such that the principal surface (the surface which is directed in the direction of the flow passage axis when the valve is closed) is substantially parallel to the flow passage direction. As a result, the valve member reduces the opening area and serves as a resistance against a fluid to thereby reduce the valve flow coefficient, such as a Cv value. Particularly, in an eccentric butterfly valve which has a stem connected to the valve member such that the rotation axis is offset in the thickness direction of the valve member from the center axis of the valve member, the valve member is increased in thickness due to the configuration. Therefore, the valve member greatly affects the reduction in the opening area or an increase in a fluid resistance. There are proposed, as one of measures against such problems, butterfly valves configured so that a groove portion linearly extending perpendicularly to the rotation axis is provided in the principal surface of the valve member to form the cross section of the valve member into a substantially C shape, thereby increasing the opening area in full open and reducing the flow passage resistance, as described, for example, in PTL1.

CITATION LIST

Patent Literature

PTL1: Japanese Unexamined Patent Publication No. H7-113472

SUMMARY OF THE INVENTION

Technical Problem

As described above, the reduction in the thickness of a part of the valve member by forming the groove portion in the valve member is advantageous to the increase in the opening area or the reduction in the flow passage resistance. Since a fluid pressure acts on the valve member of the butterfly valve in valve closing, a predetermined thickness is required for the valve member in order to prevent deformation of the valve member against the fluid pressure. Therefore, the depth of the groove portion is limited, and thus an improvement of the valve flow coefficient is limited only by formation of the linear groove portion.

Accordingly, it is an object of the present invention to solve the problems existing in the prior art and improve a valve flow coefficient of a butterfly valve by devising a shape of a valve member.

Solution to Problem

In view of the above-described object, the present invention provides a butterfly valve including a valve body formed therein with an internal flow passage extending in a direction of a flow passage axis, a disk-shaped valve member disposed in the internal flow passage and supported by the valve body through a valve stem to be rotatable about a rotation axis perpendicular to the flow passage axis, and an annular valve seat provided on an inner periphery of the internal flow passage, the internal flow passage being opened and closed by rotating the valve stem to bring an outer peripheral edge portion of the valve member into and out of contact with the valve seat, in which the valve member is provided in one of two principal surfaces thereof opposite to each other with a groove portion extending in a direction across the rotation axis and both side walls of the groove portion are formed as convex curved surfaces extending in a convex shape toward each other in the direction of the rotation axis.

In the above-described butterfly valve, the valve member is provided in at least one of the principal surfaces thereof with the groove portion extending in the direction across the rotation axis. Hence, when the valve member is rotated to a full open position, the opening area in the internal flow passage is increased by the area of the groove portion, so that a valve flow coefficient can be increased. Moreover, the present inventors have found that generation of vortex is suppressed, so that an effect of improving the valve flow coefficient is obtained, by forming both the side walls of the groove portion as the convex curved surfaces extending in a convex shape toward each other in the direction of the rotation axis to have such a shape that throttle portions are provided in the groove portions. Thus, the valve flow coefficient of the butterfly valve can be further improved.

In the above-described butterfly valve, it is preferable that the convex curved surfaces of both the side walls of the groove portion include curved surface portions having different curvature radii and connected with a top portion interposed therebetween, and it is more preferable that the convex curved surface of the groove portion is formed such that a curvature radius of a first curved surface portion disposed on a fluid outflow side in valve opening is larger than a curvature radius of a second curved surface portion disposed on a fluid inflow side in valve opening.

As one embodiment of the butterfly valve, the valve member may have outer edge remaining portions formed on both sides in the direction of the rotation axis with the groove portion interposed therebetween and the outer edge remaining portion may have convex curved surface curved in a convex shape in a direction away from the rotation axis. Such a configuration makes it possible to further improve the valve flow coefficient.

In this case, it is preferable that the convex curved surface of each of the outer edge remaining portions has convex curved surface portions having different curvature radii and connected to each other with a top portion interposed therebetween, and it is more preferable that the convex curved surface of the outer edge remaining portion is formed such that a curvature radius of a first curved surface portion disposed on a fluid outflow side in valve opening is larger than a curvature radius of a second curved surface portion disposed on a fluid inflow side in valve opening.

The butterfly valve may be configured so that the valve member has a spherical dent portion formed in the principal surface thereof opposite to the principal surface in which the groove portion is formed. Thus, the valve flow coefficient can be further improved.

Advantageous Effect of the Invention

According to the butterfly valve of the present invention, by providing the groove portion in at least one of the principal surfaces of the valve member, the opening area can be increased, thereby improving the valve flow coefficient. Furthermore, by forming the shapes of both the side walls of the groove portion or the surface shapes of the outer edge remaining portions on both sides of the groove portion into the convex curved surfaces, a further improvement of the valve flow coefficient due to suppression of generation of vortex can be achieved.

DESCRIPTION OF EMBODIMENTS

Figure 1:
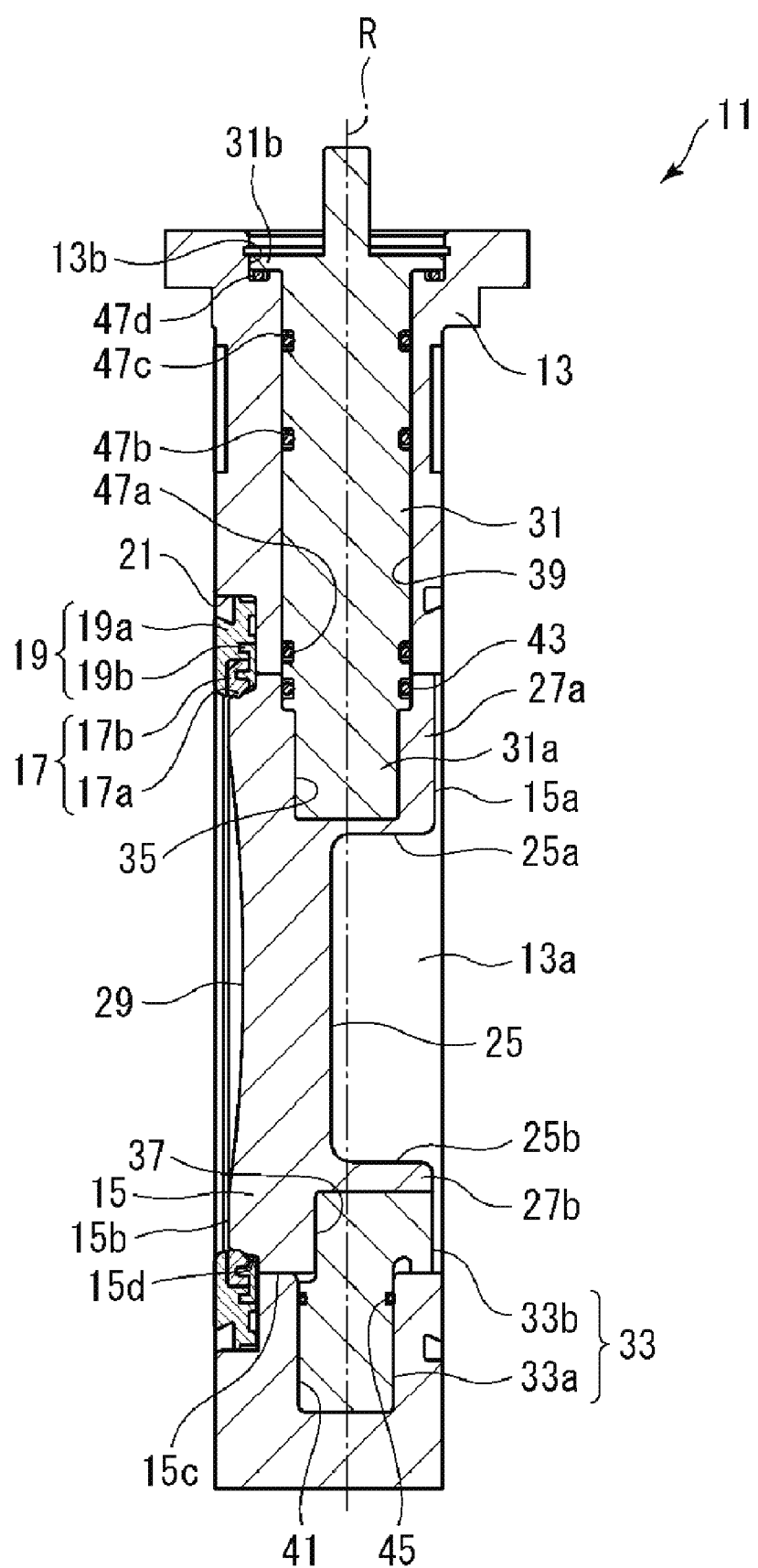
FIG. 1 is a longitudinal cross-sectional view showing the overall configuration of a butterfly valve according to the present invention.

An embodiment of a butterfly valve 11 according to the present invention will be described below with reference to the drawings.

First, an overall configuration of the butterfly valve 11 according to the present invention will be described with reference to FIG. 1 and FIG. 2.

The butterfly valve 11 includes a hollow cylindrical valve body 13 formed therein with an internal flow passage 13a extending in a direction of a flow passage axis, a substantially disk-shaped valve member 15 disposed in the internal flow passage 13a and rotatably supported by the valve body 13, an annular seat ring 17 attached to the inner periphery of the internal flow passage 13a, and an annular seat retainer 19 for fixing the seat ring 17 to the valve body 13 and is configured so that the internal flow passage 13a can be opened and closed by bringing an outer peripheral edge portion of the valve member 15 and a valve seat portion 17a formed on the seat ring 17 into and out of contact with each other.

Figure 7:
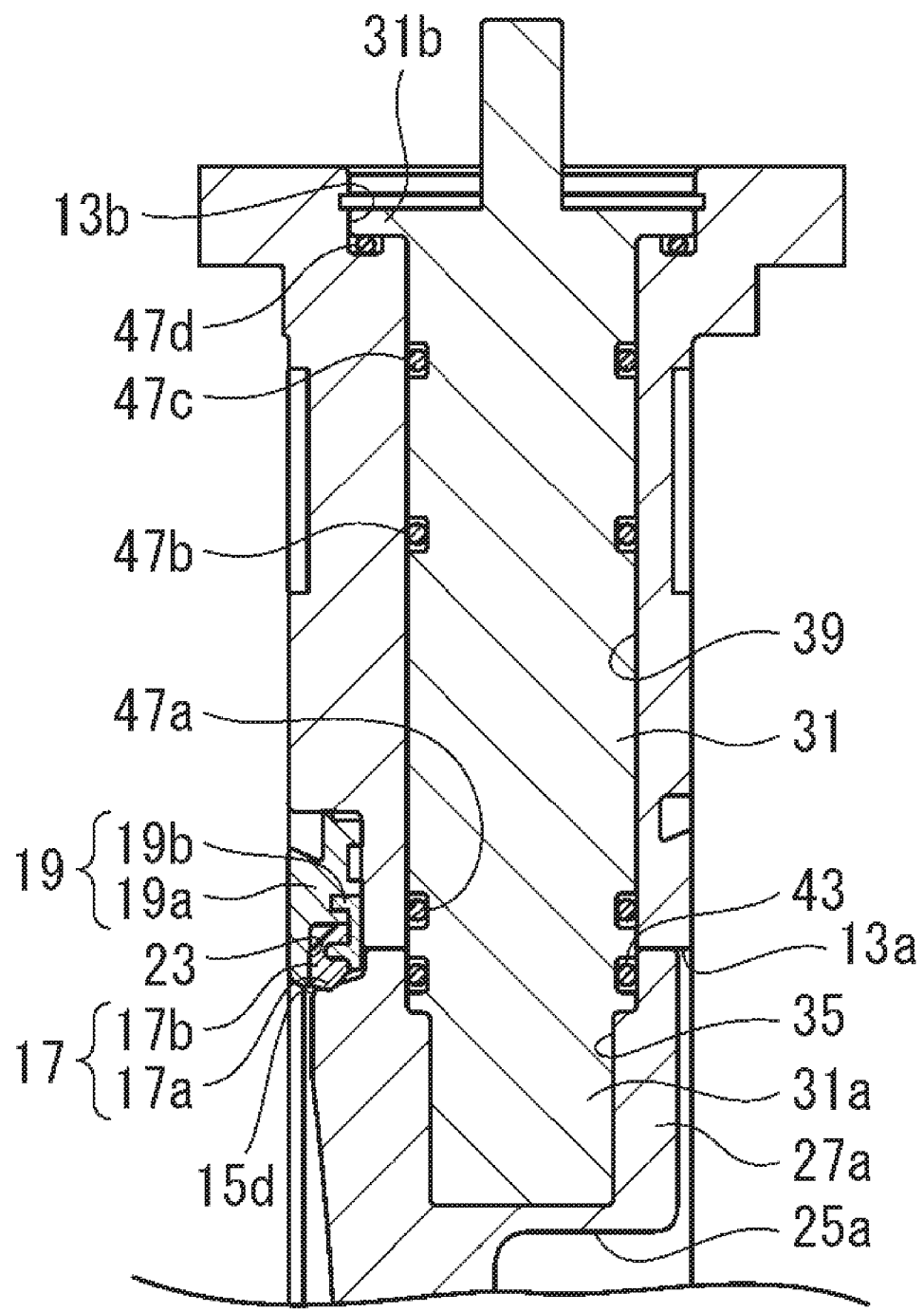
FIG. 7 is a partial longitudinal sectional view of the butterfly valve, showing a first valve stem on the upper side rotatably supporting the valve member of the butterfly valve shown in FIG. 1.

The valve body 13 is provided, in a peripheral edge portion of a downstream end portion of the internal flow passage 13a thereof in the direction of the flow passage axis, i.e., an outer surrounding portion of the internal flow passage 13a in the side surface of the valve body 13 on the downstream side in the direction of the flow passage axis, with an annular recessed portion 21 formed to extend in the radial direction to have substantially the same diameter as that of the outer diameter of the annular seat retainer 19. The seat ring 17 and the seat retainer 19 are fitted into the annular recessed portion 21. The seat retainer 19 includes an annular retainer body 19a and an annular retainer cap 19b. The retainer body 19a is formed to have a step portion 23 (see FIG. 7). The step portion 23 is configured to receive therein a retainer cap 19b and a fixing portion 17b of the seat ring 17 such that the fixing portion 17b of the seat ring 17 is arranged between the retainer cap 19b and the retainer body 19a. Such a configuration makes it possible to fix the retainer body 19a to the annular recessed portion 21 by an appropriate method and hold the fixing portion 17b of the seat ring 17 between the retainer body 19a and the retainer cap 19b arranged on the side surface of the annular recessed portion 21 in the direction of the flow passage axis, so that the seat ring 17 can be fixed to the annular recessed portion 21.

The retainer cap 19b is preferably arranged such that the inner peripheral edge end thereof projects into the internal flow passage 13a.

As a method of fixing the retainer body 19a to the annular recessed portion 21, a bayonet method disclosed in Japanese Unexamined Patent Publication No. H11-230372 can be adopted, for example. In this case, the retainer body 19a is provided, in the outer peripheral surface thereof on the side of the valve body 13, with a plurality of circular arc-shaped projection portions projecting in the radial direction and formed at equal intervals in the circumferential direction, and the annular recessed portion 21 is provided in an outer peripheral portion thereof with circular arc-shaped notch portions formed to be able to receive the circular arc-shaped projection portions and engagement grooves extending from the side of the side surface of the circular arc-shaped notch portions in the direction of the flow passage axis so as to guide the circular arc-shaped projection portions in the circumferential direction. Such a configuration makes it possible fix the retainer body 19a to the annular recessed portion 21, by turning the retainer body 19a in the circumferential direction, in a state where the circular arc-shaped projection portions of the retainer body 19a are fitted into the circular arc-shaped notch portions of the annular recessed portion 21 and then abut on the side surface of the annular recessed portion 21 in the direction of the flow passage axis, and then guiding the circular arc-shaped projection portions along the engagement grooves to engage the circular arc-shaped projection portions with the engagement grooves.

The seat ring 17 is formed of an elastic material and has the valve seat portion 17a and the fixing portion 17b. The valve seat portion 17a is formed to project into the internal flow passage 13a when the seat ring 17 is attached to the annular recessed portion 21 in the state where the fixing portion 17b is held between the retainer body 19a and the retainer cap 19b. Examples of suitable elastic materials forming the seat ring 17 include rubber elastic bodies, such as butyl rubber (BR), chloroprene rubber (CR), ethylene propylene diene rubber (EPDM), and fluororubber (FRM), fluororesin, such as polytetrafluoroethylene (PTFE), and rubber elastic bodies coated with fluororesin, such as PTFE.

Figure 2:
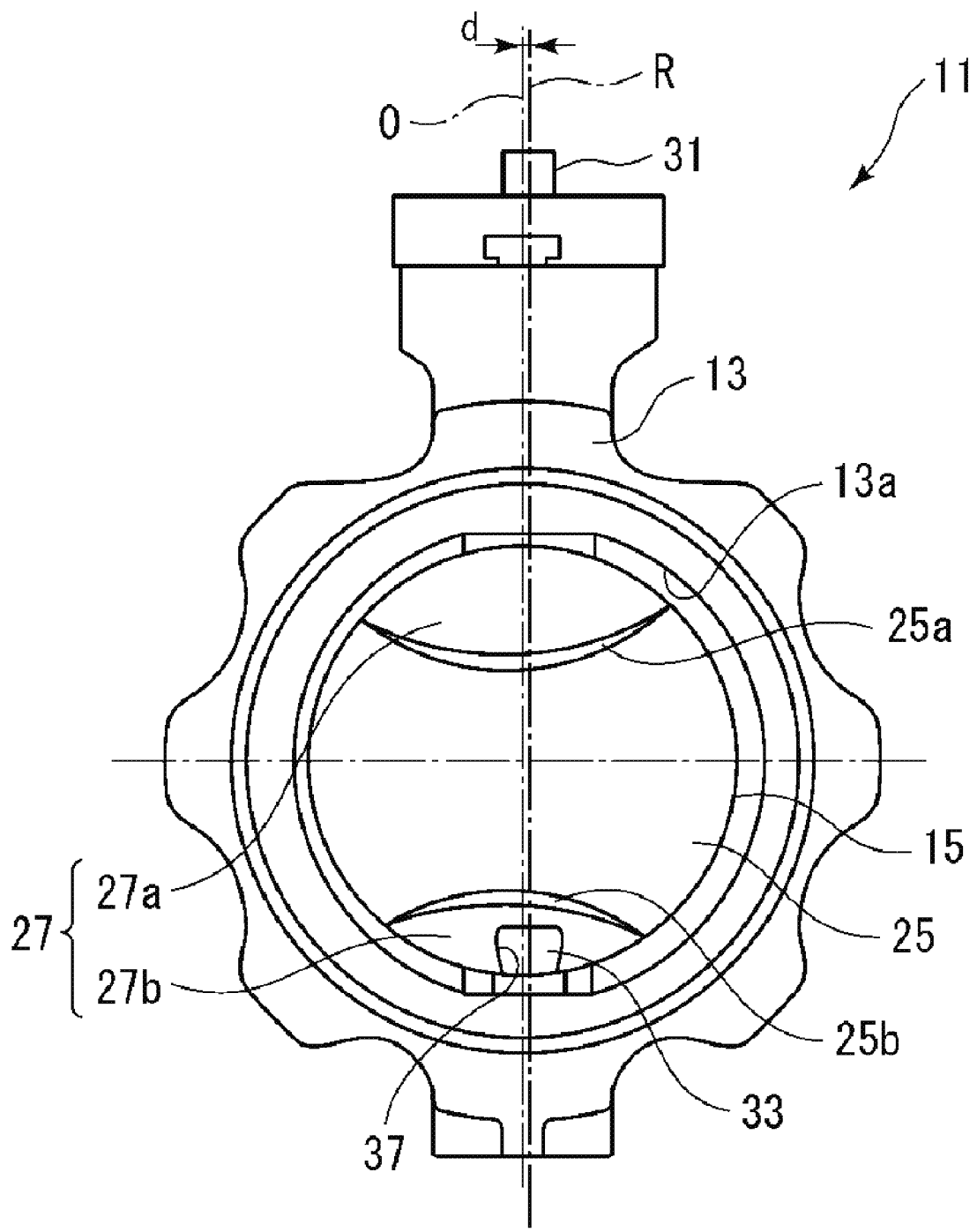
FIG. 2 is a side view of the butterfly valve shown in FIG. 1 as viewed from the right side.
Figure 3:
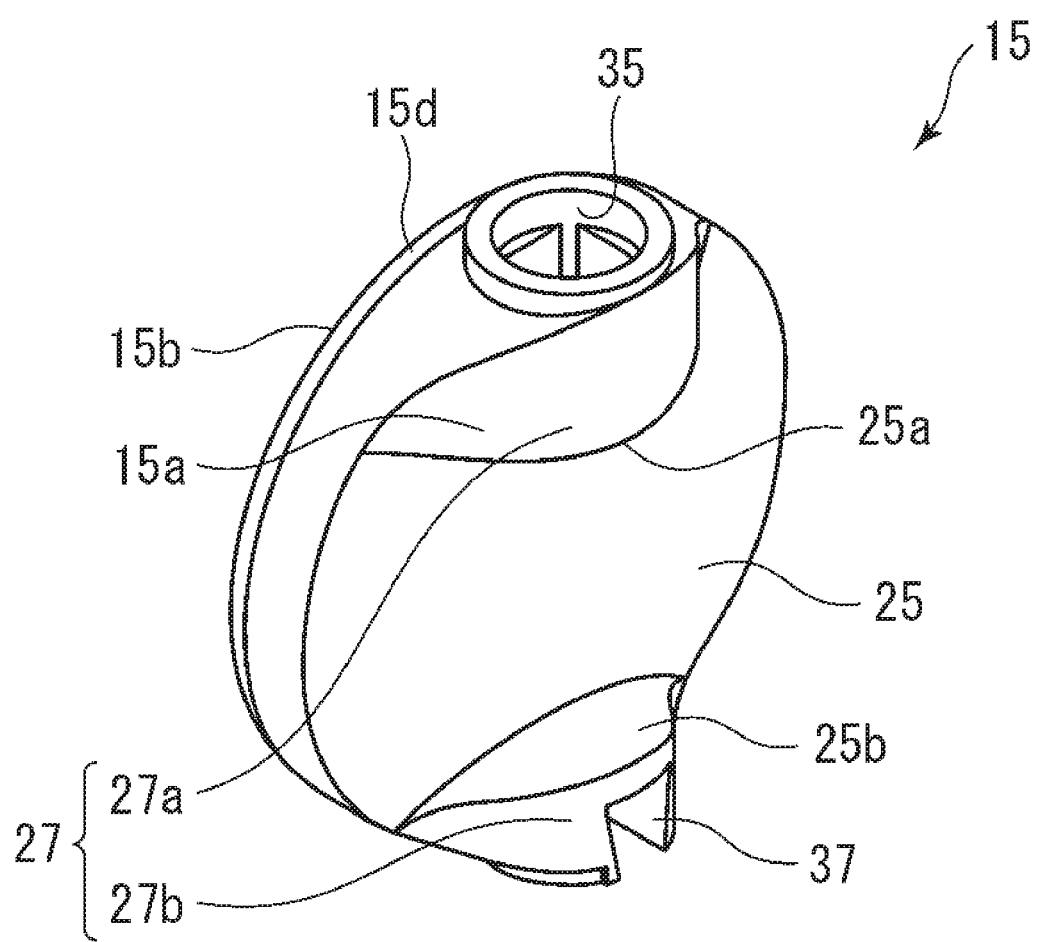
FIG. 3 is a perspective view of a valve member of the butterfly valve shown in FIG. 1.
Figure 4A:
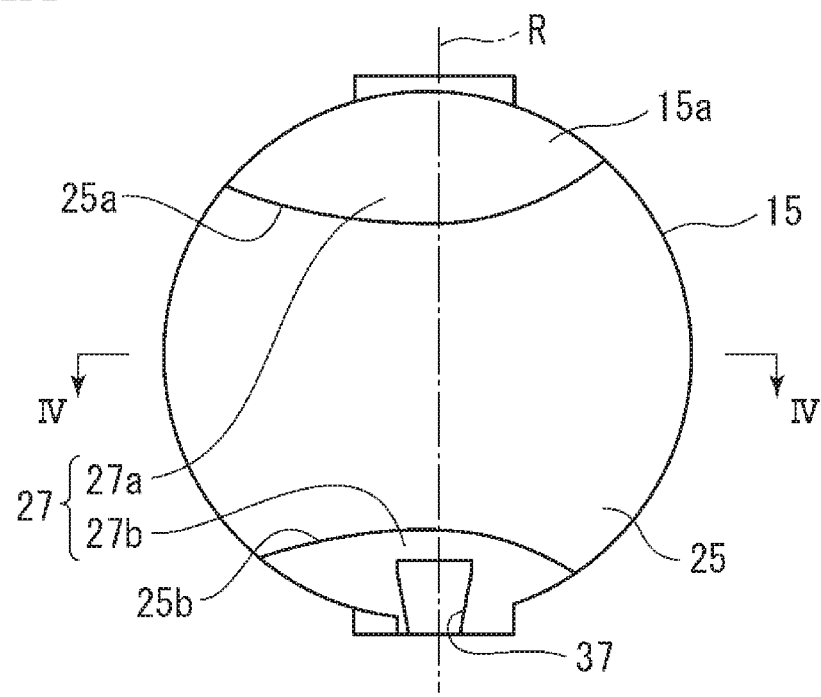
FIG. 4A is a plan view of the valve member shown in FIG. 3 as viewed from the right side in FIG. 1.
Figure 4B:
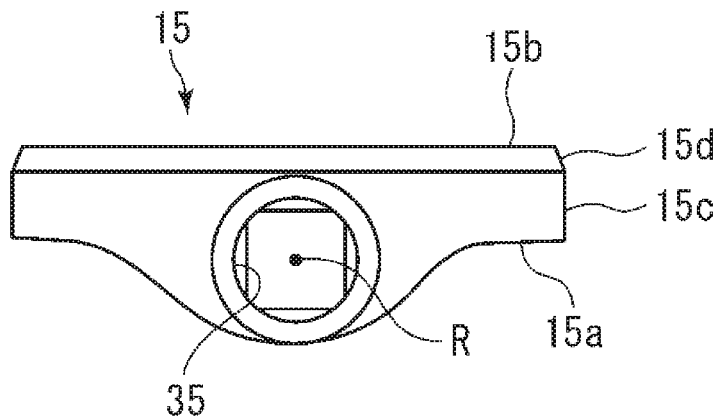
FIG. 4B is a top view of the valve member shown in FIG. 4A as viewed from above in FIG. 4A.
Figure 4C:
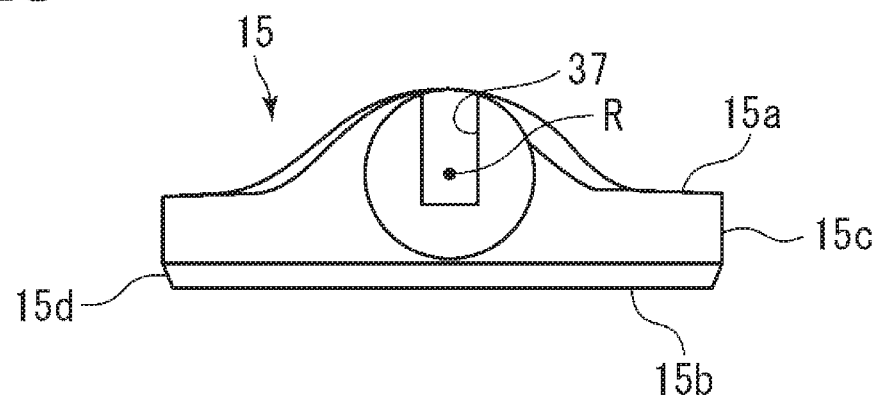
FIG. 4C is a bottom view of the valve member shown in FIG. 4A as viewed from below in FIG. 4A.

The valve member 15 has two principal surfaces 15a, 15b opposite to each other and an outer peripheral edge portion 15c annularly extending so as to connect the two principal surfaces 15a, 15b. The valve member 15 is provided in one principal surface 15a thereof with a groove portion 25 extending therethrough in a direction across (preferably a direction orthogonal to) a rotation axis R, as well shown in FIG. 3. Both side walls 25a, 25b of the groove portion 25 are formed to be convex curved surfaces extending in a convex shape toward the rotation axis R and toward each other as shown in FIG. 2 and FIG. 4A. Due to the formation of the groove portion 25 in the one principal surface 15a of the valve member 15, there are formed outer edge remaining portions 27 (27a, 27b) on both sides in the direction of the rotation axis R across the groove portion 25. The outer edge remaining portions 27 preferably have convex curved surfaces extending in a convex shape in a direction away from the rotation axis R as shown in FIG. 4B and FIG. 4C.

By providing the above-described groove portion 25, when the valve member 15 is rotated to a full open state, the opening area in the internal flow passage 13a is increased by the area of the groove portion 25, so that valve flow coefficient Cv increases. Moreover, the present inventors have found that generation of vortex is suppressed to reduce a pressure loss, by forming both the side walls 25a, 25b of the groove portion 25 as convex curved surfaces mutually extending in the convex shape toward the rotation axis R to be like throttle portions or by forming the outer edge remaining portions 27a, 27b formed on both sides of the groove portion 25 to have the convex curved surfaces extending in the convex shape in the direction away from the rotation axis R. This makes it possible to obtain an effect of improving valve flow coefficient Cv.

Figure 5:
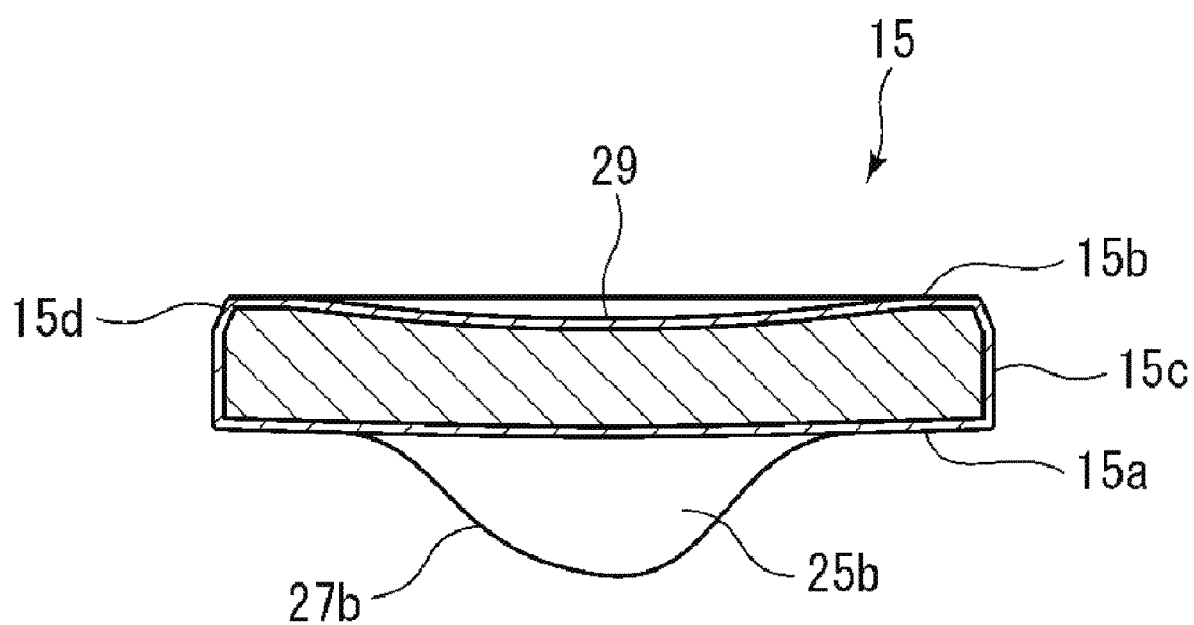
FIG. 5 is a cross-sectional view taken along line IV-IV of FIG. 4A as viewed from above in an arrow direction.

The valve member 15 has a spherical dent portion (hereinafter also referred to as "dimple") 29 formed in a center portion of the other principal surface 15b, as shown in FIG. 5. By providing the spherical dent portion 29, similarly, the generation of vortex is suppressed, so that the effect of improving valve flow coefficient can be obtained due to reduction of pressure loss.

The valve member 15 has a valve member valve seat surface 15d formed in the outer peripheral edge portion 15c thereof. By rotating the valve member 15 about the rotation axis R to press the valve member valve seat surface 15d against the valve seat portion 17a of the seat ring 17, a sealing plane sealing a space between the valve member valve seat surface 15d and the valve seat 17a is defined to close the internal flow passage 13a, thereby resulting in a closed valve state. The valve member valve seat surface 15d preferably has a shape like a part of a spherical surface.

In the butterfly valve 11 of the embodiment shown in the figures, the valve member 15 is rotatably supported by the valve body 13 with a first valve stem 31 and a second valve stem 33 and is provided at positions thereof opposite to each other in the direction of the rotation axis R with a fitting hole 35 for coupling with the first valve stem 31 and an engagement groove 37 for coupling with the second valve stem 33.

The first valve stem 31 is rotatably inserted through and supported in a first stem hole 39 formed in the valve body 13 to extend along the rotation axis R. The second valve stem 33 is inserted into and rotatably supported in a second stem hole 41 formed opposite to the first stem hole 39 across the internal flow passage 13a along the rotation axis R.

The first stem hole 39 is a stem through-hole extending through the valve body 13 from the outside to the internal flow passage 13a in the direction of the rotation axis R. The first valve stem 31 is rotatably inserted through the first stem hole 39 so that both end portions thereof project from the first stem hole 39. One end portion (upper end portion in FIG. 1) of the first valve stem 31 projecting to the outside is configured to allow a handle or a driving unit, not shown, to be attached thereto for operating or driving the valve member 15. The other end portion (lower end portion in FIG. 1) of the first valve stem 31 projecting into the internal flow passage 13a is formed to have a fitting portion 31a of a shape complementary to the fitting hole 35, so that the fitting hole 35 of the valve member 15 and the fitting portion 31a are fitted into each other to be unrotatable about the rotation axis R. For example, by forming the fitting hole 35 of the valve member 15 and the fitting portion 31a of the first valve stem 31 to have polygonal shapes, the fitting hole 35 and the fitting portion 31a can be unrotatably coupled to each other.

Figure 6A:
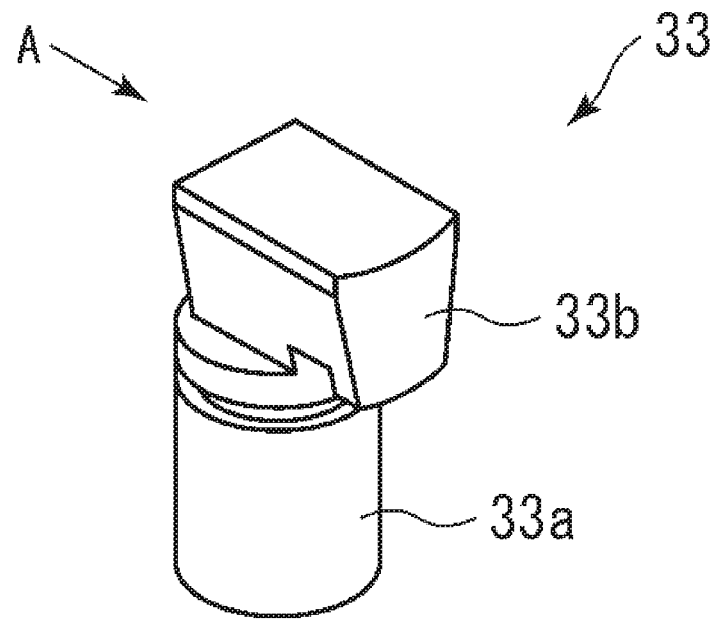
FIG. 6A is a perspective view of a second valve stem on the lower side rotatably supporting the valve member of the butterfly valve shown in FIG. 1.
Figure 6B:
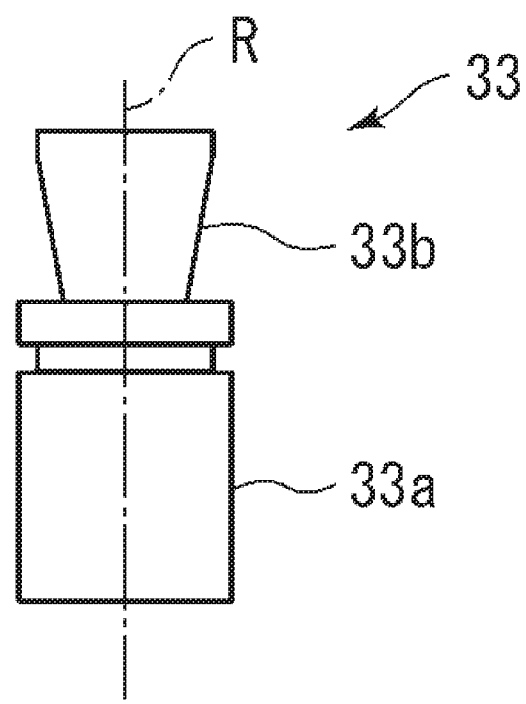
FIG. 6B is a side view of the second valve stem on the lower side rotatably supporting the valve member of the butterfly valve shown in FIG. 1 as viewed from a direction of arrow A.

On the other hand, the second stem hole 41 is a stem bottomed-hole (i.e., non-penetrating stem hole) extending in the direction of the rotation axis R from the internal flow passage 13a of the valve body 13. The second valve stem 33 is inserted into and rotatably supported in the second stem hole 41, so that one end portion thereof projects from the second stem hole 41. The second valve stem 33 includes a stem portion 33a rotatably supported in the second stem hole 41, and an engagement portion 33b which connects to the stem portion 33a and is formed to project from the second stem hole 41. The engagement portion 33b is fitted into the engagement groove 37. In detail, the engagement portion 33b is formed as a rail-like portion extending in a direction perpendicular to the rotation axis R, as shown in FIG. 6A and FIG. 6B, one end of the rail-like portion projects and extends in the direction perpendicular to the rotation axis R from the outer peripheral surface of the stem portion 33a, and the second valve stem 33 has a substantially L shape. The engagement groove 37 of the valve member 15 is formed to have a shape complementary to the rail-like portion as shown in FIG. 4A. The valve member 15 and the second valve stem 33 are coupled to each other to be unrotatable about the rotation axis R by inserting the engagement portion 33b, which is the rail-like portion, into the engagement groove 37 of the valve member 15 in the direction perpendicular to the rotation axis R. The engagement portion 33b, which is the rail-like portion, preferably has a wedge-shaped cross section expanding toward the tip from the root which is a portion connecting to the stem portion 33a. Due to such a wedge shape, the removal of the valve member 15 in the direction of the rotation axis R from the second valve stem 33 can be prevented. However, the cross-sectional shape of the engagement portion 33b is not limited insofar as the valve member 15 and the second valve stem 33 can be unrotatably coupled to each other and may be a polygonal shape, a circular shape, an oval shape, or the like.

As shown in FIG. 1, in order to prevent a fluid in the internal flow passage 13a from entering into the fitting hole 35 or the second stem hole 41 which is a bottomed hole, annular sealing members 43, 45 are disposed in annular grooves provided, on the outer peripheral surfaces of the first valve stem 31 and the stem portion 33a of the second valve stem 33, at positions facing the vicinity of an opening portion into the internal flow passage 13a on the inner peripheral surface of the fitting hole 35 and the vicinity of an opening portion into the internal flow passage 13a on the inner peripheral surface of the second stem hole 41, thereby sealing a space between the inner peripheral surface of the fitting hole 35 and the outer peripheral surface of the first valve stem 31 and a space between the inner peripheral surface of the second stem hole 41 and the outer peripheral surfaces of the stem portion 33a of the second valve stem 33. Further, in order to prevent a fluid in the internal flow passage 13a from flowing out to the outside through the first stem hole 39 which is a stem through-hole, annular sealing members 47a, 47b, 47c formed of a rubber elastic material, such as an O-ring, are disposed in annular grooves provided at a plurality of positions (three places in the embodiment shown in the figures) including a position facing the vicinity of an opening portion of the first stem hole 39 into the internal flow passage 13a on the outer peripheral surface of the first valve stem 31, thereby sealing a space between the inner peripheral surface of the first stem hole 39 and the outer peripheral surface of the first valve stem 31. Furthermore, as shown in detail in FIG. 7, the first valve stem 31 is provided, in the vicinity of an end portion thereof on the side opposite to the fitting portion 31a, with a flange portion 31b, and the valve body 13 is provided, in a portion surrounding an opening portion of the first stem hole 39 to the outside, with an annular recessed portion 13b for receiving therein the flange portion 31b. An annular plane sealing member 47d formed of a rubber elastic material is fitted into an annular groove provided on the surface (hereinafter referred to as a bottom surface) facing the flange portion 31b in the annular recessed portion 13b. The sealing member 47d disposed as described above seals a space between the flange portion 31b and the bottom surface of the annular recessed portion 13b. Thus, even when a fluid in the internal flow passage 13a enters the first stem hole 39, the fluid is prevented from leaking out to the outside from the first stem hole 39. Such a sealing structure is particularly effective when a harmful fluid flows through the internal flow passage 13a.

The butterfly valve 11 of the embodiment shown in the figures is a double eccentric butterfly valve having a double eccentric structure. Referring to FIG. 1 and FIG. 2, in the double eccentric butterfly valve 11, the valve seat portion 17a of the seat ring 17, the valve member valve seat surface 15d, the first valve stem 31, and the second valve stem 33 are provided such that the center, in the direction of the flow passage axis, of the sealing plane defined between the valve member valve seat surface 15d of the valve member 15 and the valve seat portion 17a of the seat ring 17 in valve closing is located eccentrically in the direction of the flow passage axis from the rotation axis R of the valve member 15. Furthermore, as shown in detail in FIG. 2, the first valve stem 31 and the second valve stem 33 are connected to the valve member 15 such that the rotation axis R of the valve member 15 is located away from a center axis O, which extends in parallel to the rotation axis R so as to pass through the center of the cross section of the internal flow passage 13a, by a distance d in the cross section of the internal flow passage 13a. Such a configuration makes it possible to utilize the cam action due to the eccentricity to move the valve member 15 away from the seat ring 17 with a slight angle rotation of the valve member 15 in opening and closing the valve, resulting in a low friction between the seat ring 17 and the valve member 15. Therefore, the wear of the seat ring 17 can be reduced and an operation torque can be decreased.

Moreover, the double eccentric butterfly valve 11 is configured so that the rotation axis R is located eccentrically from the center axis O of the internal flow passage 13a as described above, and therefore the maximum width of the valve member 15 in the direction of the rotation axis R is different between one side and the other side in the radial direction across the rotation axis R. Utilizing this fact, in the double eccentric butterfly valve 11 of the embodiment shown in the figures, the retainer cap 19b is disposed such that the inner peripheral edge end thereof projects into the internal flow passage 13a. Thus, by setting the amount of the projection into the internal flow passage 13a of the retainer cap 19b such that, when the valve member 15 is rotated from a closed valve state into an opened valve state, the valve member 15 can be rotated in one direction about the rotation axis R without making the outer peripheral edge portion 15c interfere with the retainer cap 19b and cannot be rotated in the other direction about the rotation axis R because of the outer peripheral edge portion 15c interfering with the retainer cap 19b, the rotating direction of the valve member 15 from a fully closed state can be restricted.

The valve body 13, the valve member 15, the seat retainer 19, the first valve stem 31, and the second valve stem 33 can be formed of metal materials, resin materials, metal materials coated with resin materials, metal materials formed by insert molding according to an injection molding method, and the like, depending on the intended use.

Next, a method for assembling the butterfly valve 11 will be described with reference to FIG. 8A to FIG. 8E.

Figure 8A:
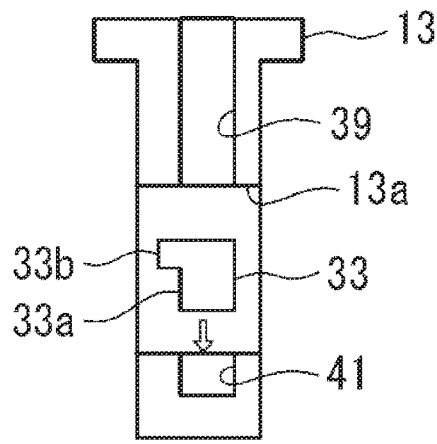
FIG. 8A is an explanatory view illustrating an assembling procedure of a valve body and the valve member of the butterfly valve shown in FIG. 1.

First, as shown in FIG. 8A, the stem portion 33a of the second valve stem 33 is rotatably inserted into the second stem hole 41 of the valve body 13. At this time, the second valve stem 33 is disposed such that the rail-like portion of the engagement portion 33b of the second valve stem 33 extends in the direction of the flow passage axis and the side projecting in the direction perpendicular to the rotation axis R from the peripheral surface of the stem portion 33a is directed to the mounting side (annular recessed portion 21 side) of the seat ring 17.

Figure 8B:
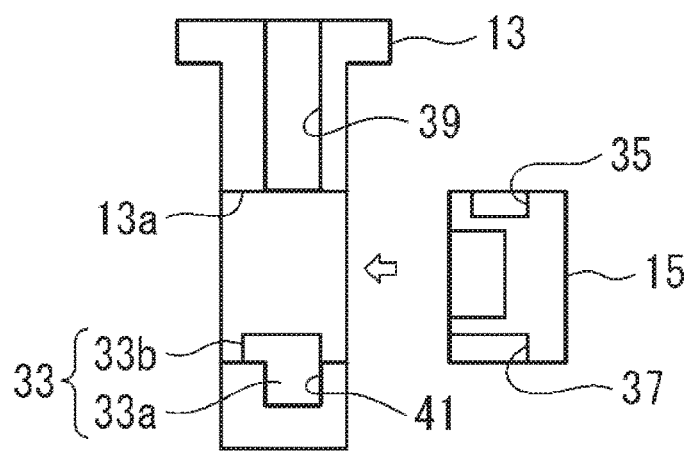
FIG. 8B is an explanatory view illustrating an assembling procedure of the valve body and the valve member of the butterfly valve shown in FIG. 1.
Figure 8C:
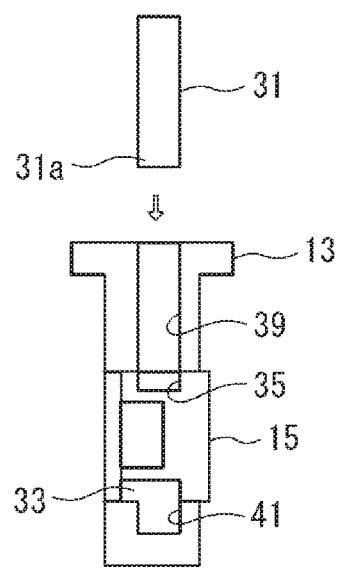
FIG. 8C is an explanatory view illustrating an assembling procedure of the valve body and the valve member of the butterfly valve shown in FIG. 1.

Next, as shown in FIG. 8B, the valve member 15 is inserted into the internal flow passage 13a of the valve body 13 in the direction of the flow passage axis from the side of the valve body 13 opposite to the annular recessed portion 21 in the direction of the flow passage axis, in a state where the engagement groove 37 of the valve member 15 is directed to the valve body 13 side, so that the engagement portion 33b of the second valve stem 33 and the engagement groove 37 of the valve member 15 are fitted into each other and the engagement portion 33b is received in the engagement groove 37 until the engagement portion 33b reaches an end portion of the engagement groove 37. As shown in FIG. 8C, the first valve stem 31 is then inserted into the first stem hole 39, so that the fitting portion 31a of the first valve stem 31 is unrotatably fitted into the fitting hole 35 of the valve member 15. Thus, the valve member 15 is supported in the internal flow passage 13a of the valve body 13 to be rotatable about the rotation axis R.

By inserting the valve member 15 into the internal flow passage 13a in the state where the second valve stem 33 is disposed in the direction described above, the valve member 15 can be inserted from the side close to the second valve stem 33, which facilitates the work.

Figure 8D:
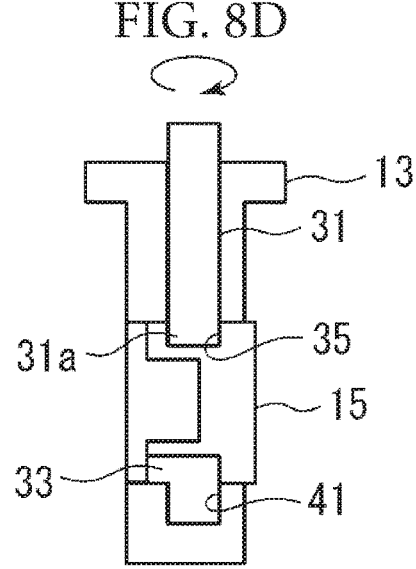
FIG. 8D is an explanatory view illustrating an assembling procedure of the valve body and the valve member of the butterfly valve shown in FIG. 1.
Figure 8E:
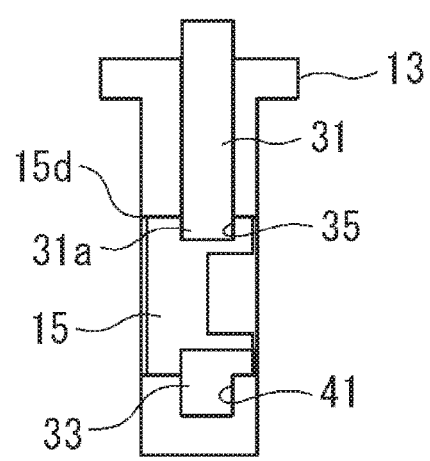
FIG. 8E is an explanatory view illustrating an assembling procedure of the valve body and the valve member of the butterfly valve shown in FIG. 1.

Next, as shown in FIG. 8D, the valve member 15 is rotated by 180° about the rotation axis R in the internal flow passage 13a, and, as shown in FIG. FIG. 8E, the valve member valve seat surface 15d of the valve member 15 is disposed to be directed to the side on which the seat ring 17 is mounted, i.e., the annular recessed portion 21 side. Thereafter, the seat ring 17 is attached to the annular recessed portion 21 by the seat retainer 19, so that the assembling of the butterfly valve 11 is completed.

Next, a detailed configuration of the valve member 15 will be further described.

It is preferable that the convex curved surfaces of both side walls 25a, 25b, in the direction of the rotation axis R, of the groove portion 25 of the valve member 15 include curved surface portions which have different curvature radii and are connected with a top portion interposed therebetween, and it is more preferable that the convex curved surfaces of the side walls 25a, 25b are formed such that the curvature radius of a first curved surface portion disposed on an outflow side (i.e., seat ring 17 side) in valve opening is larger than the curvature radius of a second curved surface portion disposed on an inflow side in valve opening. Moreover, it is preferable that the convex curved surfaces of the outer edge remaining portions 27 formed on both sides of the groove portion 25 in the direction of the rotation axis have curved surface portions which have different curvature radii and are connected with a top portion interposed therebetween, and it is more preferable that the convex curved surfaces of the outer edge remaining portion 27 is formed such that the curvature radius of the first curved surface portion disposed on the outflow side (i.e., seat ring 17 side) in valve opening is larger than the curvature radius of the second curved surface portion disposed on the inflow side in valve opening. Such a configuration makes it possible to obtain an effect of further improving the valve flow coefficient Cv.

EXAMPLES

A table will be given below which illustrates a comparison among the valve flow coefficients Cv obtained by a simulation when the curvature radii of the convex curved surfaces of both the side walls 25a, 25b of the groove portion 25 and the curvature radii of the convex curved surfaces of outer edge remaining portions 27a, 27b are individually varied.

TABLE 1

|  | R1 | R2 | R3 | R4 | R5 | R6 | R7 | R8 | R9 | R10 | R11 | R12 | Dimple | Cv Value |
|---|---|---|---|---|---|---|---|---|---|---|---|---|---|---|
| Comparative Example | 0 | 0 | 0 | 0 | 0 | 0 | 0 | 0 | 0 | 0 | 0 | 0 | None | 947 |
| Example 1 | 75 | 150 | 75 | 150 | 40 | 40 | 40 | 40 | 50 | 21.5 | 40 | 30 | 400 | 1225 |
| Example 2 | 67.5 | 135 | 67.5 | 136 | 0 | 0 | 0 | 0 | 0 | 0 | 0 | 0 | None | 1205 |
| Example 3 | 82.5 | 165 | 82.5 | 165 | 0 | 0 | 0 | 0 | 0 | 0 | 0 | 0 | None | 1215 |
| Example 4 | 75 | 150 | 75 | 150 | 40 | 40 | 40 | 40 | 40 | 21.5 | 40 | 30 | None | 1218 |

Figure 9A:
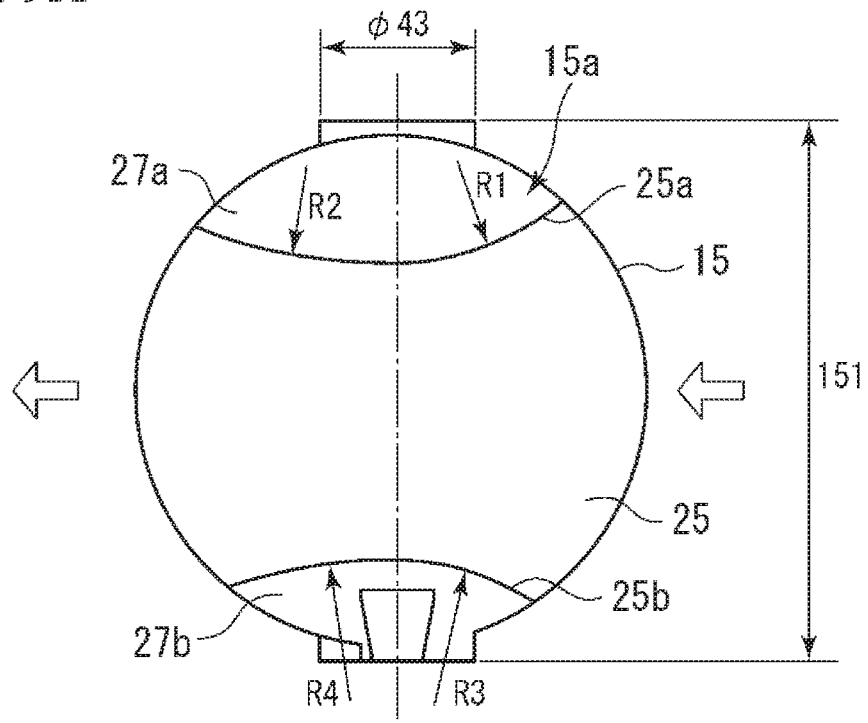
FIG. 9A is an explanatory view of the valve member shown in FIG. 1 as viewed from the right side in FIG. 3, illustrating parameters used in a simulation.
Figure 9B:
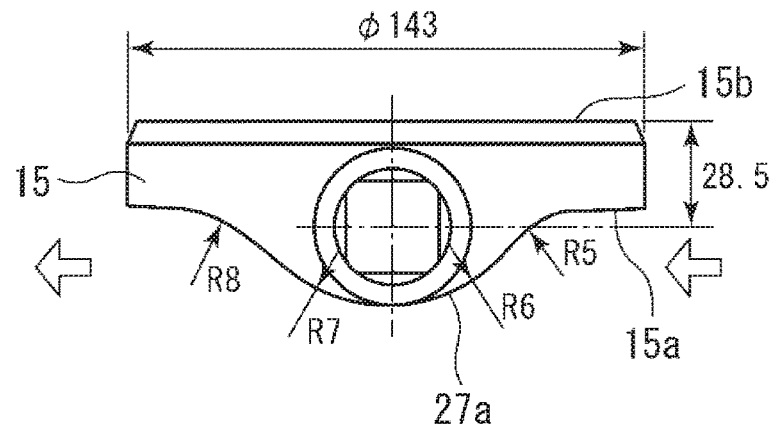
FIG. 9B is an explanatory view of the valve member shown in FIG. 9A as viewed from above in FIG. 9A, illustrating the parameters used in the simulation.
Figure 9C:
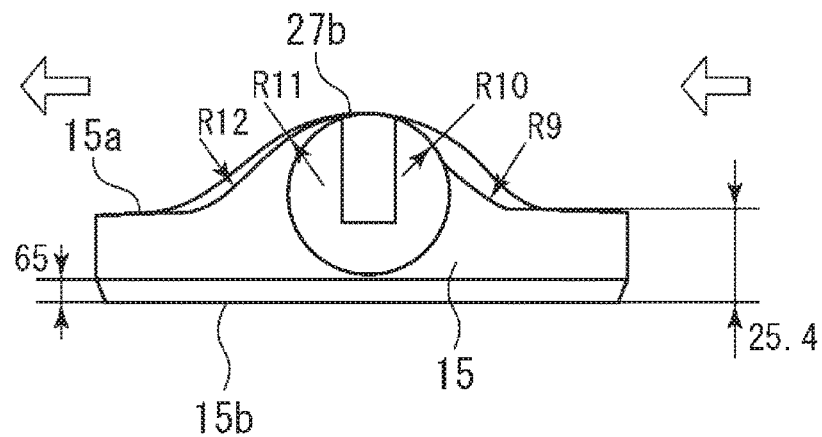
FIG. 9C is an explanatory view of the valve member shown in FIG. 9A as viewed from below in FIG. 9A, illustrating the parameters used in the simulation.

A conventional example is a butterfly valve in which a groove portion is provided as with the butterfly valve 11 while both side walls of the groove portion in the direction of the rotation axis R are configured by planes parallel to the flow passage axis and the surfaces of outer edge remaining portions are configured only by non-curved planes. Example 1 to Example 4 are butterfly valves according to the present invention in which the groove portion 25 is provided as with the butterfly valve 11 and the curvature radii of the convex curved surfaces of both the side walls 25a, 25b of the groove portion 25, the curvature radii of the convex curved surfaces of the outer edge remaining portions 27a, 27b, and the presence or absence of a dimple 29 are variously varied as parameters. The simulation was performed under a setting where the butterfly valve 11 having a nominal diameter D=150 mm is connected on the upstream side thereof to a linear inlet flow passage having a length of 2D and is connected on the downstream side thereof to a linear outlet flow passage having a length of 6D and where a differential pressure between the inlet flow passage and the outlet flow passage is set to 1 kPa. FIG. 9A to FIG. 9C illustrate parameters R1 to R12 used in the simulation. The arrows in FIG. 9A to FIG. 9C illustrate the fluid flow direction.

R1 and R2 designate the curvature radii of the convex curved surface portions disposed at the inflow side (inlet side) and the outflow side (outlet side) with the top portion interposed therebetween in valve opening, respectively, on the upper side wall 25a of the groove portion 25 in FIG. 9A. R3, R4 designate the curvature radii of the convex curved surface portions disposed at the inflow side (inlet side) and the outflow side (outlet side) on the lower side wall 25b of the groove portion in FIG. 9A, respectively, with the top portion interposed therebetween in valve opening. Further, as shown in FIG. 9B, the surface of the upper outer edge remaining portion 27a in FIG. 9A has such a configuration that: a convex curved surface portion of a curvature radius R6 located on the inflow side (inlet side) in valve opening and a convex curved surface portion of a curvature radius R7 located on the outflow side (outlet side) in valve opening are connected with the top portion interposed therebetween; a concave curved surface portion of a curvature radius R5 is further connected to the upstream side of the convex curved surface portion of the curvature radius R6 on the inflow side; and a concave curved surface portion of a curvature radius R8 is further connected to the downstream side of the convex curved surface portion of the curvature radius R7 on the outflow side, i.e., a configuration in which two S-shaped curved surface portions are connected with the top portion interposed therebetween. Similarly, as shown in FIG. 9C, the surface of the lower outer edge remaining portion 27b in FIG. 9A has such a configuration that: a convex curved surface portion of a curvature radius R10 located on the inflow side (inlet side) in valve opening and a convex curved surface portion of a curvature radius R11 located on the outflow side (outlet side) in valve opening are connected with the top portion interposed therebetween; a concave curved surface portion of a curvature radius R9 is further connected to the upstream side of the convex curved surface portion of the curvature radius R10 on the inflow side; and a concave curved surface portion of a curvature radius R12 is further connected to the downstream side of the convex curved surface portion of the curvature radius R11 on the outflow side, i.e., a configuration in which two S-shaped curved surface portions are connected with the top portion interposed therebetween.

The valve flow coefficient was calculated by the following expression.

$$Cv = 11.57Q\sqrt{\frac{p}{Pw}\frac{1}{\Delta p}}$$ [Math. 1]

$Q$: Measured value of volume flow rate (m³/h)

$\Delta p$: Measured value of valve static pressure loss (kPa)

$p$: Fluid density (kg/m³)

$Pw$: Water density (kg/m³)

Water was used as the fluid, and the fluid density was set to 997.561 kg/m³, which is the water density.

Example 2 and Example 3 are examples of butterfly valves in cases where the groove portion 25 is provided, both the side walls 25a, 25b of the groove portion 25 in the direction of the rotation axis R are formed to be convex curved surfaces extending in a convex shape toward each other, and the surfaces of the outer edge remaining portions 27a, 27b are formed as planes as with the prior art. When the prior art is compared with Example 2 and Example 3, it is found that an effect of improving the valve flow coefficient Cv is obtained by forming both the side walls 25a, 25b of the groove portion 25 in the direction of the rotation axis R as the convex curved surfaces extending in a convex shape toward each other.

Example 4 is an example of a butterfly valve in a case where the groove portion 25 is provided, both the side walls 25a, 25b of the groove portion 25 in the direction of the rotation axis R are formed to be convex curved surfaces extending in a convex shape toward each other, and the upper and lower outer edge remaining portions 27a, 27b are formed to have curved surfaces curved in a convex shape in a direction perpendicular to the rotation axis R. A comparison among Example 2 to Example 4 shows that the valve flow efficient Cv is largest when the convex curved surfaces of both the side walls 25a, 25b of the groove portion 25 are formed such that the curvature radius R2 of the convex curved surface portion disposed at the outflow side (outlet side) in valve opening is larger than the curvature radius R1 of the convex curved surface portion disposed at the inflow side (inlet side) in valve opening and R1=75 mm, R2=150 mm, R3=75 mm, and R4=150 mm, i.e., ratios of R1:R2=1:2 and R3:R4=1:2 are established.

Moreover, a comparison among Example 2 to Example 4 shows that an effect of improving the valve flow coefficient Cv is obtained when the surfaces of the outer edge remaining portions 27a, 27b are formed such that the curvature radii R7, R11 of the convex curved surface portions disposed at the outflow side (outlet side) in valve opening are larger than the curvature radii R6, R10 of the convex curved surface portions disposed at the inflow side (inlet side) in valve opening and R6=40 mm, R7=50 mm, R10=21.5 mm, and R11=40 mm are set in both the upper outer edge remaining portion 27a and the lower outer edge remaining portion 27b. Furthermore, it is found that an effect of improving the valve flow coefficient Cv is obtained when the surface of the upper outer edge remaining portion 27a is formed such that the curvature radius R5 of the concave curved surface portion disposed at the inflow side in valve opening and the curvature radius R6 of the convex curved surface portion disposed at the inflow side in valve opening have a relation of R5=40 mm and R6=40 mm, i.e., R5:R6=1:1 and the curvature radius R7 of the convex curved surface portion disposed at the outflow side in valve opening and the curvature radius R8 of the concave curved surface portion disposed at the outflow side in valve opening have a relation of R7=50 mm and R8=40 mm, i.e., R7:R8=1.25:1. Similarly, it is found that an effect of improving the valve flow coefficient Cv is obtained when the surface of the lower outer edge remaining portion 27b is formed such that the curvature radius R9 of the concave curved surface portion disposed at the inflow side in valve opening and the curvature radius R10 of the convex curved surface portion disposed at the inflow side in valve opening have a relation of R9=50 mm and R10=21.5 mm, i.e., R9:R10=2.3:1, and the curvature radius R11 of the convex curved surface portion disposed at the outflow side in valve opening and the curvature radius R12 of the concave curved surface portion disposed at the outflow side in valve opening have a relation of R11=40 mm and R12=30 mm, i.e., R11:R12=1.3:1.

Example 1 is an example of a butterfly valve in the case where a spherical dent portion (dimple) having a curvature radius of 400 mm is further provided in the form of the valve member of Example 4 on the other principal surface 15b opposite to the principal surface 15a of the valve member 15 where the groove portion 25 is formed. A comparison between Example 1 and Example 4 shows that an effect of further improving the valve flow coefficient Cv is obtained by providing the spherical dimple on the other principal surface 15b opposite to the principal surface 15a of the valve member 15 where the groove portion 25 is formed.

While the butterfly valve 11 according to the present invention has been described above with reference to the embodiment shown in the figures, the present invention is not limited to the embodiment shown in the figures. For example, in the above-described embodiment, the present invention has been described based on the embodiment in which the present invention is applied to the double eccentric butterfly valve 11. However, the application of the present invention is not limited to the double eccentric butterfly valve and the present invention may be applied to a single eccentric butterfly valve or a multiple eccentric butterfly valve. Moreover, the present invention may be also applicable to a so-called center-type butterfly valve in which the rotation axis R extends through the center of the sealing plane and the center of the internal flow passage 13a and the like.

DESCRIPTION OF REFERENCE NUMERALS 11 butterfly valve
13 valve body
13a internal flow passage
15 valve member
15a, 15b principal surface
15c outer peripheral edge portion
15d valve member valve seat surface
17 seat ring
17a valve seat portion
25 groove portion
27, 27a, 27b outer edge remaining portion
29 dent portion (dimple)
31 first valve stem
33 second valve stem

The invention claimed is:

1. A butterfly valve comprising:
a valve body formed therein with an internal flow passage extending in a direction of a flow passage axis, and including a valve stem rotatable about a rotation axis perpendicular to the flow passage axis,
a disk-shaped valve member disposed in the internal flow passage and rotatably supported to the valve body through the valve stem, and including two principal surfaces opposite to each other,
an annular valve seat provided on an inner periphery of the internal flow passage, said internal flow passage being opened and closed by rotating the valve stem to bring an outer peripheral edge portion of the valve member into and out of contact with the valve seat,
wherein one of two principal surfaces including a groove portion, the groove portion extending in a direction across the rotation axis and both side walls of the groove portion in a direction of the rotation axis are formed as convex curved surfaces extending in convex shapes toward each other in the direction of the rotation axis, wherein the convex surfaces intersect the rotation axis, and
each of the convex curved surfaces of both the side walls of the groove portion includes curved surface portions having curvature radii different from each other and connected with a top portion interposed therebetween.

2. The butterfly valve according to claim 1, wherein each of the convex curved surfaces of the groove portion is formed such that a curvature radius of a first curved surface portion to be on a downstream side of the valve member when the valve is in an open position is larger than a curvature radius of a second curved surface portion to be on an upstream side of the valve member when the valve is in the open position.

3. The butterfly valve according to claim 2, wherein the valve member has a spherical dent portion formed in the other of two principal surfaces opposite to the one of two principal surfaces in which the groove portion is formed.

4. The butterfly valve according to claim 1, wherein the valve member has outer edge remaining portions formed on both sides in the direction of the rotation axis with the groove portion interposed therebetween and each of the outer edge remaining portions has a convex curved surface curved in a convex shape in a direction away from the rotation axis.

5. The butterfly valve according to claim 4, wherein each of the convex curved surfaces of the outer edge remaining portions has convex curved surface portions having curvature radii different from each other and connected to each other with a top portion interposed therebetween.

6. The butterfly valve according to claim 4, wherein the convex curved surfaces of the outer edge remaining portions are formed such that a curvature radius of a first curved surface portion to be on a downstream side of the valve member when the valve is in an open position is larger than a curvature radius of a second curved surface portion to be on an upstream side of the valve member when the valve is in the open position.

7. The butterfly valve according to claim 4, wherein the valve member has a spherical dent portion formed in the other of two principal surfaces opposite to the one of two principal surfaces in which the groove portion is formed.

8. The butterfly valve according to claim 5, wherein the valve member has a spherical dent portion formed in the other of two principal surfaces opposite to the one of two principal surfaces in which the groove portion is formed.

9. The butterfly valve according to claim 6, wherein the valve member has a spherical dent portion formed in the other of two principal surfaces opposite to the one of two principal surfaces in which the groove portion is formed.

10. The butterfly valve according to claim 1, wherein the valve member has a spherical dent portion formed in the other of two principal surfaces opposite to the one of two principal surfaces in which the groove portion is formed.

11. The butterfly valve according to claim 1, wherein the convex curved surfaces are curved such that a distance between the top portions of the convex curved surfaces is shortened.

* * * * *